United States Patent [19]

Anderson

[11] Patent Number: 5,146,798
[45] Date of Patent: Sep. 15, 1992

[54] WEDGE-HINGE TRANSMISSION APPARATUS AND METHOD

[76] Inventor: Clifton G. Anderson, 11502 Fruitwood Dr., Houston, Tex. 77089

[21] Appl. No.: 508,831

[22] Filed: May 30, 1990

[51] Int. Cl.⁵ ............................................. F16H 31/10
[52] U.S. Cl. .......................................... 74/87; 74/845; 74/591; 185/33
[58] Field of Search ................ 185/4, 6, 7, 27, 32, 185/33; 74/845, 591, 87

[56] References Cited

U.S. PATENT DOCUMENTS

| 475,580 | 5/1892 | Lewis | 185/33 |
|---|---|---|---|
| 573,583 | 12/1896 | Ericsson | 185/33 |
| 872,909 | 12/1907 | De Vos | 185/27 |
| 2,184,200 | 12/1939 | Thomas | 74/591 |
| 3,810,394 | 5/1974 | Novak | 74/84.5 |
| 4,333,548 | 6/1982 | Jones | 185/33 |

FOREIGN PATENT DOCUMENTS

| 1456 | 8/1877 | Fed. Rep. of Germany | 185/32 |
|---|---|---|---|
| 1244819 | 9/1960 | France | 185/27 |

OTHER PUBLICATIONS

*Physics;* Paul A. Tysler; ©1976, pp. 80, 81, 92-95, 441-443 and 463-466.

Primary Examiner—Allan D. Herrmann
Assistant Examiner—David W. Laub
Attorney, Agent, or Firm—Harrison & Egbert

[57] ABSTRACT

An apparatus and method are provided for amplifying, torque and transmitting power using a novel wedge hinge assembly. In a preferred embodiment of the present invention, four wedge hinge assemblies cooperating with a specially configured crankshaft and a pair of circular plates, enable the transmission of energy primarily based upon naturally occurring gravitational forces. Each wedge hinge assembly consists of an arm having a weight at its remote end, and is adapted to be pivotally attached at its other end to the crankshaft. In addition, operating as a fulcrum, this weight arm is also pivotally attached to its corresponding wedge hinge, disposed between the two opposite ends of the arm.

3 Claims, 8 Drawing Sheets

FIG. 1

FRONT VIEW
0° AT TOP CENTER

FIG. 2

TOP VIEW
0° AT TOP CENTER

FIG. 3

LEFT SIDE VIEW
0° AT TOP CENTER

FIG. 4

FRONT VIEW
0° AT 45°

FIG. 5

TOP VIEW
0° AT 45°

FIG. 6

LEFT SIDE VIEW
0° AT 45°

WEDGE-HINGE TRANSMISSION APPARATUS AND METHOD

BACKGROUND OF THE INVENTION

This invention relates to apparatus and methods for transmitting power, and more particularly relates to methods and apparatus for generating and transmitting power using a novel wedge hinge assembly.

It is well known in the prior art that there are limited resources which can be cost-effectively harnessed into useful energy. It is well known in the prior art that there is a limited supply of naturally occurring energy throughout the world. As is also well known by those skilled in the art, several attempts have been made to derive electrical energy and the like from such natural occurrences as solar energy, wind and even ocean waves.

For example, in U.S. Pat. No. 4,352,023, Sachs et al. disclose a mechanism for generating power from wave motion occurring on a body of water. A gyro-wave energy transducer mounted on a buoyant body is adapted to float on the body of water and translate the pendulum-like motions of the buoyant body into rotational motion from which electrical energy is generated. It should be apparent, however, that this approach is susceptible to the adverse effects of corrosion and, of course, the vagaries of the sea.

Other attempts to generate power from natural resources have been limited by the availability of such resources as ultraviolet rays and wind. Conventional approaches for generating energy from fossil fuels, in addition to depleting natural resources, cause pollution and present threats to the integrity of a fragile environment. It has heretofore been unknown to those skilled in the art how to generate power without depleting any natural resources, and without being limited to the vagaries of environmental conditions and the like.

Accordingly, these limitations and disadvantages of the prior art are overcome with the present invention, and improved means and techniques are provided which are especially useful for amplifying torque and transmitting energy based primarily upon the harnessing of power generated from naturally occurring gravitational forces using the inherent internal movements of a wedge hinge assembly heretofore unknown in the prior art.

SUMMARY OF THE INVENTION

The present invention provides a method and apparatus for amplifying torque and transmitting energy based primarily upon the harnessing of power generated by from the effect of gravitational force and resultant centrifugal force upon the inherent internal movement of a wedge hinge assembly as herein described.

In accordance with the preferred embodiment of the present invention, a novel transmission apparatus is provided with four wedge hinge assemblies cooperating with the crankshaft thereof. More particularly, each wedge hinge assembly consists of an arm having a weight at its remote end, and is adapted to be pivotally attached at its other end to the crankshaft. In addition, operating as a fulcrum, this weight arm is also pivotally attached to its corresponding wedge hinge, disposed between the two opposite ends of the arm.

Thus, when an external motor applies power to the preferred embodiment rotational movement, cycles are effected, causing gravitational forces to act upon the weights thereof, thereby driving two of them downwards, in turn causing a pivotal movement upon their respective fulcrum journals and corresponding dual crankshaft journals positioned on a crankshaft designed in accordance with the present invention. As these two weights move downward, functionally related crank members are lifted by the cooperation between the wedge hinge assemblies and the crankshaft, through crankshaft journals. As these two wedge hinge assemblies lift the corresponding crank members, they also pry upward the other two wedge hinge assemblies, under the influence of resultant centrifugal force. This unique rotational movement of the wedge hinges and the corresponding crankshaft crank members, as hereinafter will be described in detail, is coordinated through the action of corresponding fulcrum journals and crankshaft journals.

It is a feature of the present invention that energy efficiently may be transmitted using primarily naturally occurring gravitational forces.

It is an object of the present invention to provide an apparatus and method for harnessing energy by attenuating the load bearing resistance that a generator imposes upon a machine.

It is a further object of the present invention to provide an apparatus and method for conveniently and efficiently enabling the conservation of energy, natural resources, and the environment.

It is a specific object of the present invention to provide a transmission apparatus comprising a first substantially circular plate; a second substantially circular plate parallel to said first plate; a crankshaft disposed transversely of said first and second plates and passing axially therethrough, and being supported by a crossbrace member disposed transversely thereof, and fixedly attached at each end to a support brace member disposed parallel of the longitudinal axis of said crankshaft and fixedly attached to said plates; said crankshaft comprising a first crank portion and a second crank portion interconnected by a contiguous central boss portion, with said second crank portion being disposed oppositely of said first crank portion, with respect to said longitudinal axis of said crankshaft; each said crankshaft crank portion comprising, successively, an edge boss member, a first transversal member, a crank member, and a second transversal member; four wedge hinge assemblies with each said assembly comprising an arm having a weight at its remote end, and adapted to be pivotally attached with said crankshaft at the other end, and further adapted to be pivotally attached to a wedge hinge between said ends thereof, for rotating said crankshaft in response to functionally related rotation of said plates; each of said wedge hinges comprising, successively, a first boss member, a first transversal member, a crank member, a second transversal member, and a second boss member, to form a crank portion adapted to cooperate with a corresponding said crank portion of said crankshaft; and said crank member of each said crank portion of said crankshaft being adapted to pivotally receive two said remote end of said arm of each of said wedge hinge assemblies.

These and other objects and features of the present invention will become apparent from the following detailed description, wherein reference is made to the FIGURES in the accompanying drawings.

DETAILED DESCRIPTION

Figure 1:
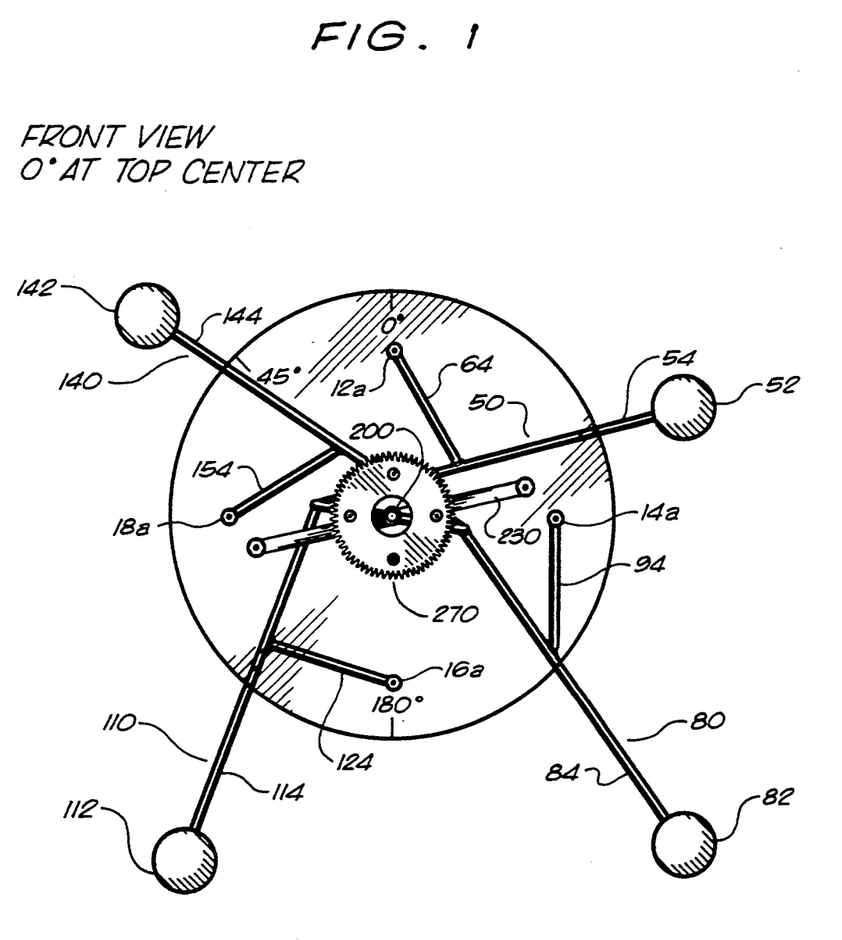
FIG. 1 is a front view of a wedge hinge transmission apparatus embodying the present invention, with one of a plurality of wedge hinge assemblies disposed at the top center of the plates thereof.

Referring now to FIG. 1, there may be seen a front view of a wedge hinge transmission apparatus 2 embodying the present invention. Wedge hinge assemblies 50, 80, 110 and 140 are shown fixedly attached to crankshaft 200. More particularly, wedge hinge assembly 50 consists of preferably spherical weight 52, arm 54 and wedge hinge 64. Similarly, wedge hinge assembly 80 consists of preferably spherical weight 82, arm 84 and wedge hinge 94; wedge hinge assembly 110 consists of preferably spherical weight 112, arm 114 and wedge hinge 124; and wedge hinge assembly 140 consists of preferably spherical weight 142, arm 144 and wedge hinge 154. Accordingly, it should be apparent that FIG. 1 depicts the said plurality of wedge hinge assemblies with spherical weight 52 of wedge hinge assembly 50 disposed zero degrees at top center thereof.

Figure 2:
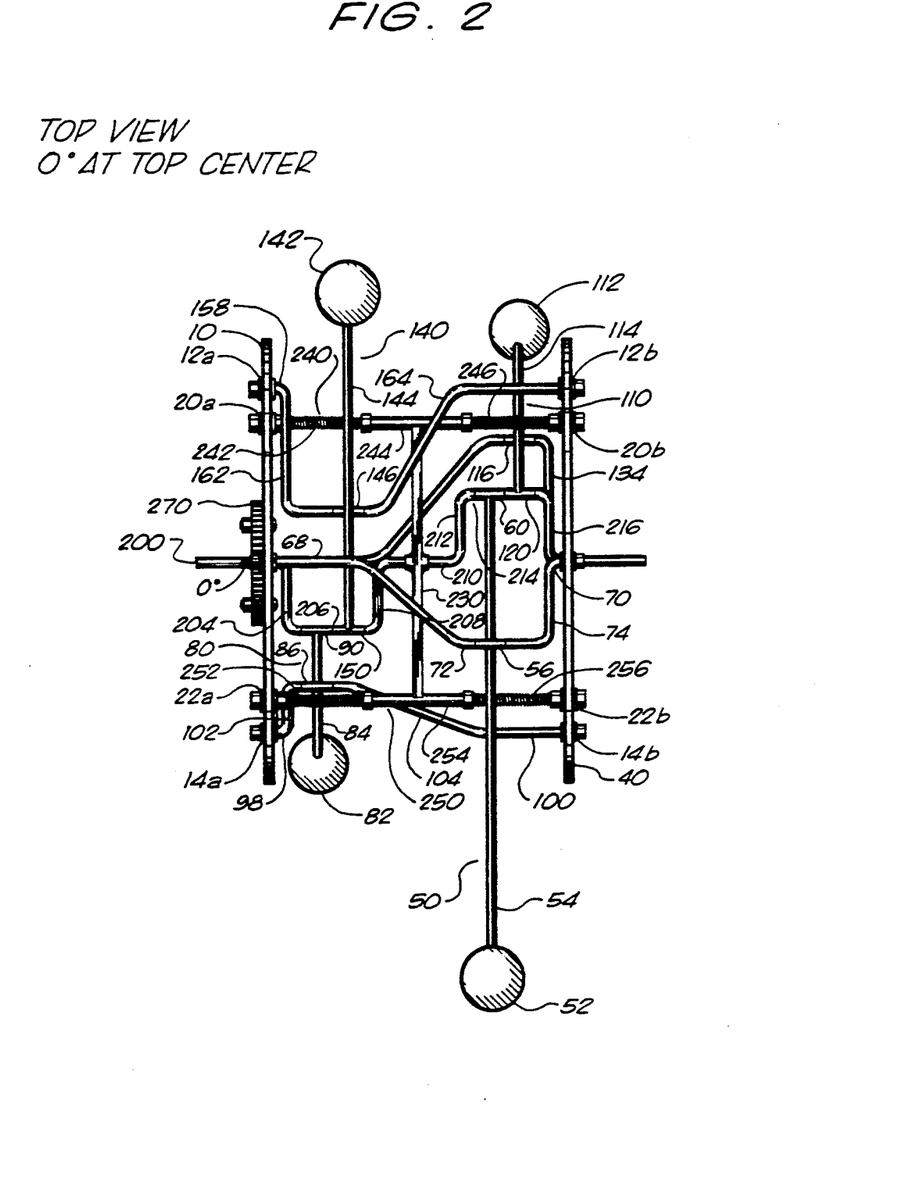
FIG. 2 is a top plan view of the wedge hinge transmission apparatus depicted in FIG. 1.
Figure 3:
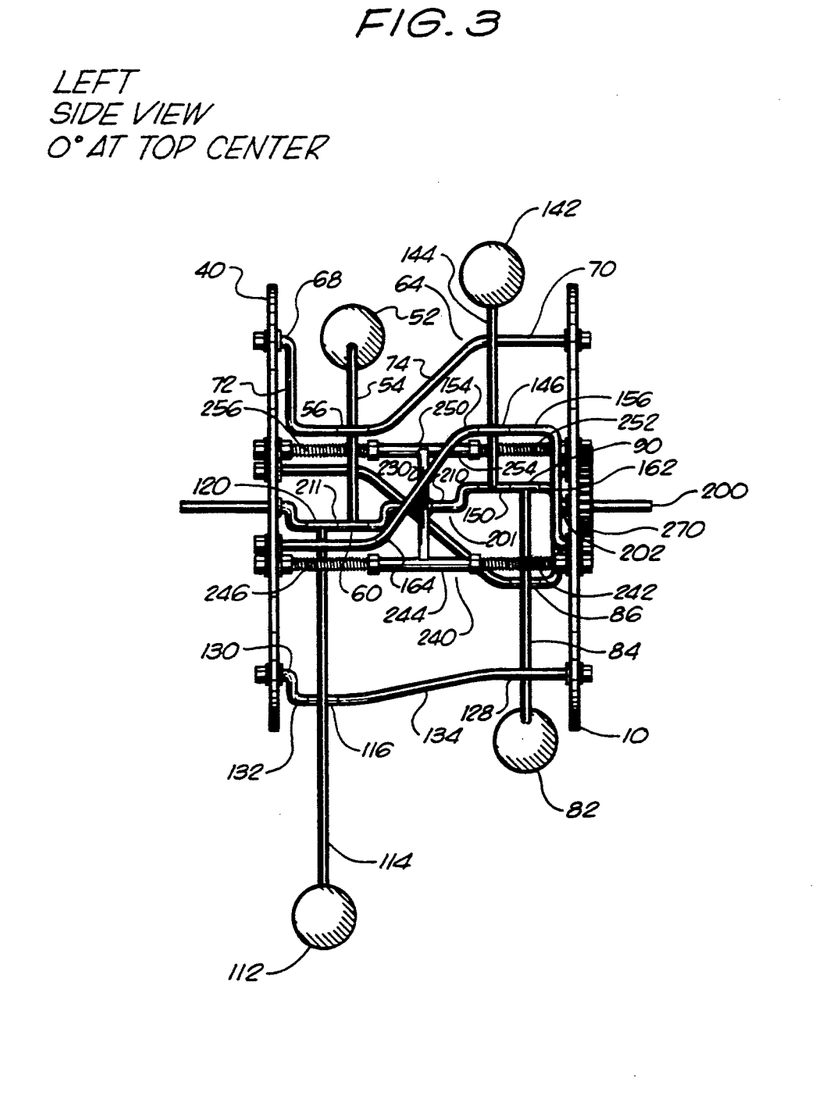
FIG. 3 is a left side view of the wedge hinge transmission apparatus depicted in FIG. 1.

Now referring to FIGS. 2 and 3, there are shown top plan and side views of the wedge hinge configuration shown in FIG. 1. The plurality of wedge hinges is clearly seen to be fixedly attached to front circular plate 10 and rear circular plate 40. In particular, wedge hinge 64 is bolted to front circular plate 10 at aperture 12a and to rear circular plate 40 at aperture 12b. Wedge hinge 94 is bolted to front circular plate 10 at aperture 14a and to rear circular plate 40 at aperture 14b; wedge hinge 124 is bolted to the front plate at aperture 16a and to the rear plate at aperture 16b; and wedge hinge 154 is bolted to the front plate at aperture 18a and to the rear plate at aperture 18b.

Still referring to the wedge hinge configuration depicted in FIGS. 1, 2 and 3, there may be seen crankshaft 200 passing through aperture 232 of crank crossbrace 230, which is fixedly attached to support braces 340 and 250. Crankshaft 200 is shown disposed transversely of the longitudinal axes of crank crossbrace 230, at passes therethrough at the midpoint thereof. Crank crossbrace 230 preferably has a substantially rectangular cross-section. Support brace 340 is fixedly attached to front plate 10 at aperture 20a and to rear plate 40 at aperture 20b. Similarly, support brace 250 is fixedly attached to front plate 10 at aperture 22a and to rear plate 40 at aperture 22b.

In accordance with the present invention and referring to FIGS. 2 and 3, wedge hinge 64 is seen to be comprised of a bar preferably of cylindrical cross-section shaped into a first boss member 68, first transversal member 72, crank member 66, second transversal member 74 and second boss member 70. Arm 54 is fixedly attached to crank member 66 of wedge hinge 64 at fulcrum journal 56 and to crankshaft journal 60. As should be apparent to those skilled in the art, crankshaft journal 60 rotates about crankshaft 200 and fulcrum journal rotates about crank member 66 of wedge hinge 64.

Similarly, wedge hinge 94 is seen to be comprised of a bar preferably of cylindrical cross-section shaped into a first boss member 98, first transversal member 102, crank member 96, second transversal member 104 and second boss member 100. Arm 84 is fixedly attached to crank member 96 of wedge hinge 94 at fulcrum journal 86 and to crankshaft journal 90. Similarly, wedge hinge 124 is seen to be comprised of a bar preferably of cylindrical cross-section shaped into a first boss member 128, first transversal member 132, crank member 126, second transversal member 134 and second boss member 130. Arm 114 is fixedly attached to crank member 126 of wedge hinge 124 at fulcrum journal 116 and to crankshaft journal 120. Wedge hinge 154 is seen to be comprised of a bar preferably of cylindrical cross-section shaped into a first boss member 158, first transversal member 162, crank member 156, second transversal member 164 and second boss member 160. Arm 144 is fixedly attached to crank member 156 of wedge hinge 154 at fulcrum journal 146 and to crankshaft journal 150.

Referring again to FIGS. 2 and 3, support brace 340 is seen to be comprised of shank members 242 and 246, and brace member 244. Brace member 244 is screwably attached at each of its ends to each of shank members 242 and 246. Similarly, support brace 250 is seen to be comprised of shank members 252 and 256, and brace member 254. Brace member 254 is screwably attached at each of its ends to each of shank members 252 and 256. In accordance with the present invention, crankshaft 200 preferably comprises two crank portions 201 and 211. More particularly, first crank portion 201 includes end boss member 202, transversal member 204, crank member 206, transversal member 208 and medial boss member 210. Second crank portion 211 includes said medial boss member 210, transversal member 212, crank member 214, transversal member 216 and end boss member 218. As depicted in FIG. 3, first crank portion 201 and second crank portion 211 should preferably be disposed on opposite sides of the longitudinal axis of crankshaft 200. In accordance with the preferred embodiment of the present invention, each crank member 206 and 214 includes two adjacent crankshaft journals. In particular, crank member 206 of crank portion 201 contains crankshaft journal 90 of wedge hinge assembly 80 and crankshaft journal 150 of wedge hinge assembly 140. Similarly, crank member 214 of crank portion 211 contains crankshaft journal 60 of wedge hinge assembly 50 and crankshaft journal 120 of wedge hinge assembly 110.

In accordance with the preferred embodiment of the present invention, arms 54, 84, 114, and 144 of wedge hinge assemblies 50, 80, 110 and 140, respectively, should preferably be of equal length and with equal weights 52, 82, 112, and 142, respectively. It will become apparent to those skilled in the art, however, that this equilibrium between the plurality of wedge hinge assemblies can alternatively be achieved by designing the torque of each such assembly, obtained by the product of its arm length and its weight, to be substantially equal. As will be hereinafter described in detail, the unique cooperation between the symmetrical rotational movement of the hereinbefore described plurality of wedge hinge assemblies, and the corresponding crankshaft members integrated therewith, amplifies torque and efficiently transmits energy primarily resulting from the gravitational forces upon the plurality of weights thereof, and the resultant centrifugal force engendered therefrom.

Accordingly, still referring to FIGS. 1-3, when a small continuous quantum of energy is applied by an electrical motor and the like to gear 270, wedge apparatus 2 commences rotational movement cycles. Thus, assuming that plates 10 and 40 commence counterclockwise rotation, wedge hinge assembly 50 disposed with weight 52 at zero degrees top center, also commences counterclockwise movement. In particular, under the preferred embodiment of the present invention, the gravitational force upon weight 52 drives it downwards causing a pivotal movement upon fulcrum journal 56 and dual crankshaft journals 60 and 120. As weight 52 moves downward, crank member 211 is lifted by the cooperation between wedge hinge assembly 50 and crankshaft 200, through crankshaft journal 60. As wedge hinge assembly 50 lifts crank member 211 as hereinbefore described, it also pries upward wedge hinge assembly 110. More particularly, the gravitational force which drives weight 52 downward correspondingly drives weight 112 of wedge hinge assembly 110 upward, under the influence of resultant centrifugal force. As should be apparent to those skilled in the art, the rotational movement of wedge hinges 64 and 124, and crankshaft crank member 211, is coordinated through the action of corresponding fulcrum journals 56 and 116, and crankshaft journals 60 and 120, respectively.

As should also be clear to those skilled in the art, this cooperative movement of wedge hinge assemblies 50 and 110 relative to crankshaft crank member 211, is propagated to wedge hinge assemblies 80 and 140 relative to crankshaft crank member 201. Thus, the gravitational force driving weight 52 downward and causing weight 110 to move upwards, also drives weight 142 downward, thereby causing weight 82 to move upwards. Similarly, the rotational movement of wedge hinges 94 and 154, and crankshaft crank member 201, is coordinated through the action of corresponding fulcrum journals 86 and 146, and crankshaft journals 90 and 150, respectively.

Accordingly, it is a feature and advantage of the present invention, that the plurality of symmetrical weights is inherently balanced by the cooperation between the rotational plate movement and the action of the plurality of wedge hinges. Indeed, the action of the fulcrum journal upon its corresponding wedge hinge and the related action of preferably two pair of crankshaft journals upon a specially configured crankshaft, in accordance with the present invention, has hitherto been unknown in the prior art.

Figure 4:
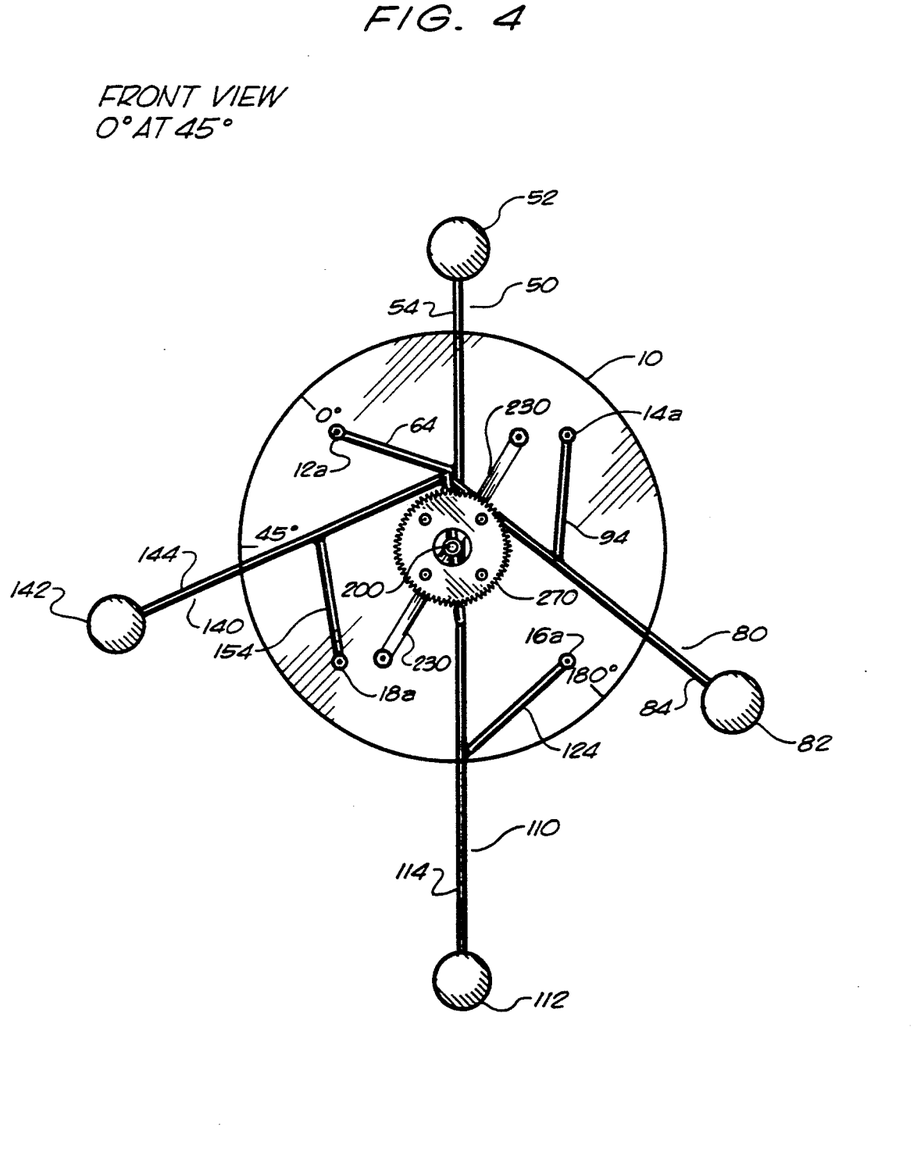
FIG. 4 is a front view of the wedge hinge transmission apparatus embodying the present invention depicted in FIG. 1, after the apparatus has been rotated approximately forty-five (45) degrees counterclockwise from top center.
Figure 5:
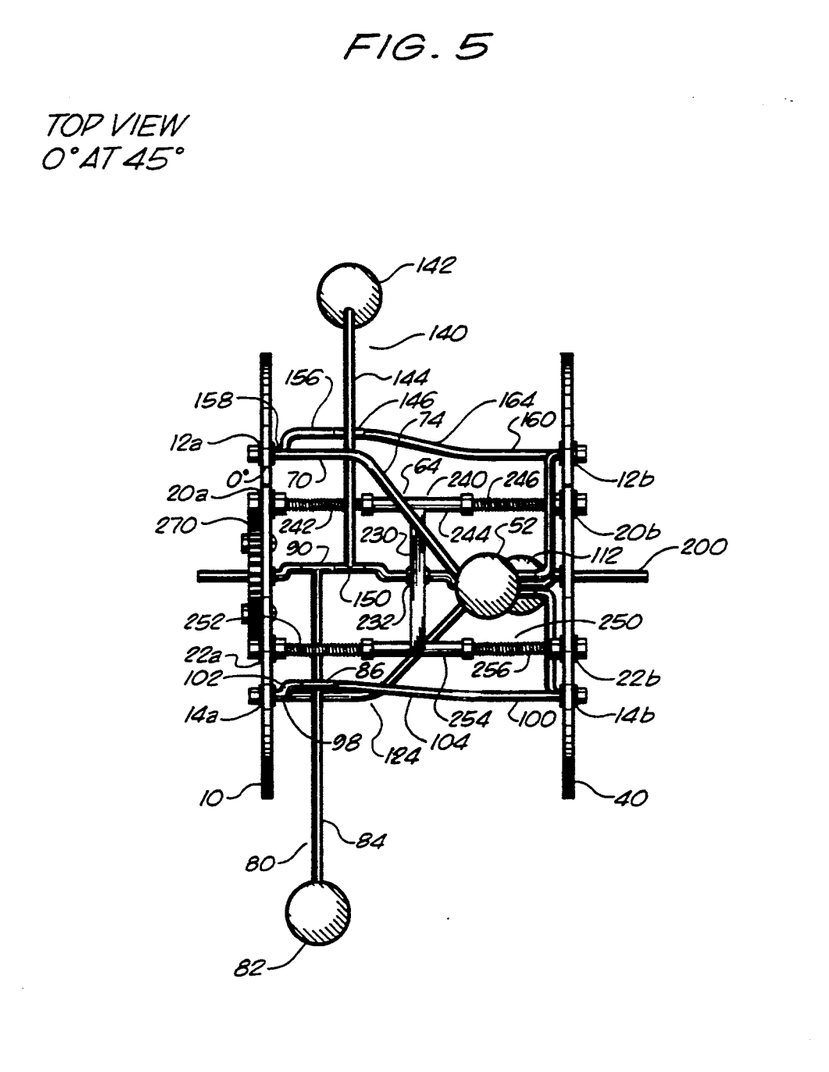
FIG. 5 is a top plan view of the wedge hinge transmission apparatus embodying the present invention depicted in FIG. 2, after the apparatus has been rotated approximately forty-five (45) degrees clockwise from top center.
Figure 6:
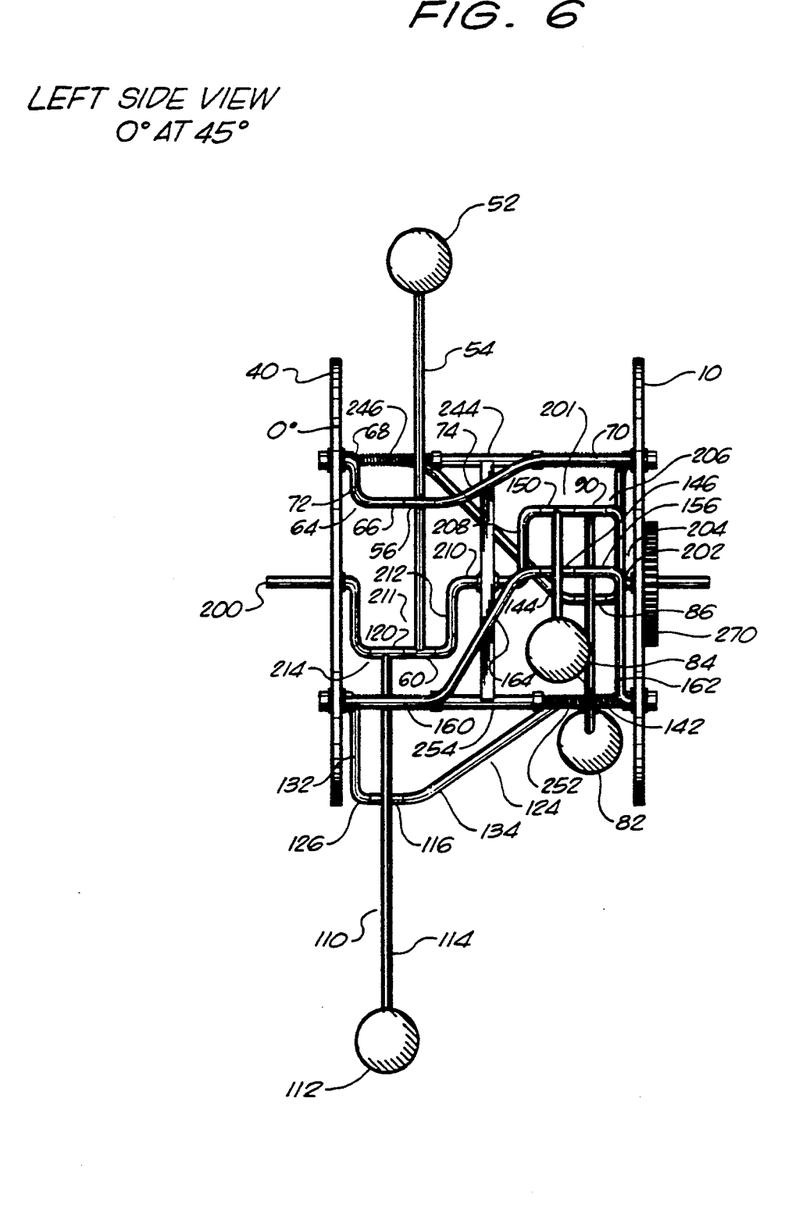
FIG. 6 is a left side view of the wedge hinge transmission apparatus embodying the present invention depicted in FIG. 3, after the apparatus has been rotated approximately forty-five (45) degrees clockwise from top center.

Now referring to FIG. 4, there may be seen a front view of the wedge hinge apparatus depicted in FIG. 1, after the apparatus has been rotated approximately forty-five (45) degrees counterclockwise from top center, and FIGS. 5 and 6, top plan and left side views of the wedge hinge apparatus depicted in FIGS. 2 and 3, after the apparatus has been rotated approximately forty-five (45) degrees clockwise from top center. The movement of weights 52, 142, 112 and 82 of wedge hinge assemblies 50, 140, 110 and 80, respectively, is clearly seen in FIG. 4. In particular, rotating the plates of apparatus 2 through approximately forty five (45) degrees counterclockwise, causes corresponding rotation of wedge hinge assembly 50, under the influence of gravitational force exerted downward upon weight 52, and a related movement, through crankshaft fulcrum pair 60 and 120, of wedge hinge assembly 110, under similar influence of centrifugal force exerted upward upon weight 112. Similarly, this plate rotation, under the present invention, causes corresponding rotation of wedge hinge assembly 140, under the influence of gravitational force exerted downward upon weight 142, and a related movement, through crankshaft fulcrum pair 90 and 150, of wedge hinge assembly 80, under similar influence of centrifugal force exerted upward upon weight 82.

Referring specifically to FIG. 5, there is shown support brace 240 comprised of shank members 242 and 246, and brace member 244. Brace member 244 is screwably attached at each of its ends to each of shank members 242 and 246. Similarly, support brace 250 is seen to be comprised of shank members 252 and 256, and brace member 254. Brace member 254 is screwably attached at each of its ends to each of shank members 252 and 256. Also clearly depicted therein is the relationship between crank member 206 and wedge hinges 80 and 140, and between crank member 214 and wedge hinges 50 and 110.

It should be apparent to those skilled in the art that to maintain the alignment between the medial portion of the arm of each wedge hinge with its corresponding fulcrum journal, and the related alignment of the remote portion of the arm with its corresponding crankshaft journal, as hereinbefore described, retainers may preferably be disposed adjacent each such journal. Thus, referring to wedge hinge 50 in FIG. 3, retainers of comparable cross-section may be disposed on each side of fulcrum journal 60 and crankshaft journal 60, to maintain the alignment of arm 54 therewith. Similarly, referring to wedge hinge 110, retainers may be disposed on each side of fulcrum journal 116 and crankshaft journal 120, to maintain the alignment of arm 114 therewith. Similarly, referring to wedge hinge 80, retainers may be disposed on each side of fulcrum journal 86 and crankshaft journal 90, to maintain the alignment of arm 84 therewith; and referring to wedge hinge 140, retainers may be disposed on each side of fulcrum journal 146 and crankshaft journal 150, to maintain the alignment of arm 144 (shown in FIG. 2) therewith. As should also be apparent to those skilled in the art, retainers disposed on either side of pairs of crankshaft journals 60 and 120. 90 and 150, may suffice to align them with their corresponding weight arms and fulcrum journals.

It is a feature and advantage of the present invention that a plurality of wedge hinge assemblies, as hereinbefore described in detail, may be cascaded to optimize their performance by maintaining continual balance and stability thereof. As an illustration of this aspect of the present invention, FIG. 7 depicts the front view of a first wedge hinge assembly 320 cascaded with a second wedge hinge assembly 350, with the joinder thereof being achieved at housing 400.

More particularly, crankshaft 325 of wedge hinge assembly 320 is interconnected with crankshaft 355 of wedge hinge assembly 350 through spider gear assembly 450. Input plate 330 of wedge hinge assembly 320 is electrically interconnected with conventional spur gear 315 and the like, which is driven by input motor 310. Output plate 335 of wedge hinge assembly 320 is interconnected with input plate 360 of wedge hinge assembly 350 through housing 400 for spider gear assembly 450 and conventional spur gear 420 and the like.

Figure 8:
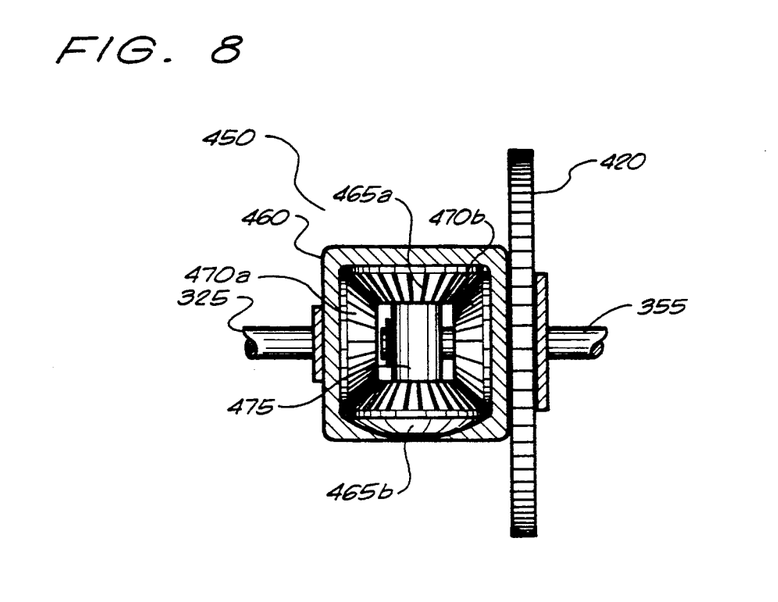
FIG. 8 is an enlarged front view of the spider gear assembly of the cascaded wedge hinge transmission structure depicted in FIG. 7.
Figure 9:
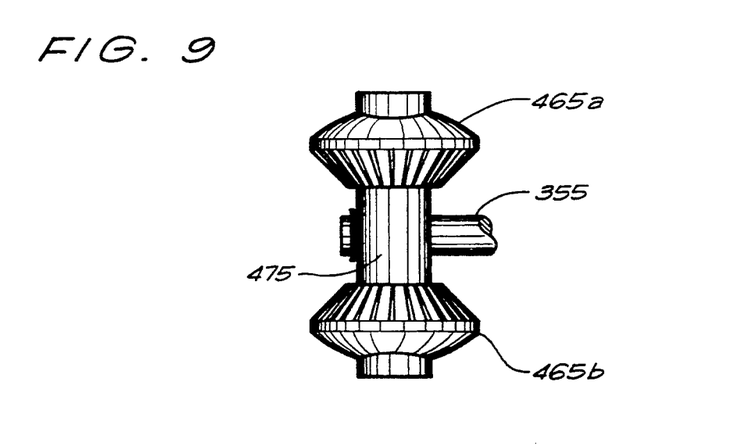
FIG. 9 is a cut-away front view of the spider gear assembly depicted in FIG. 8

As should be evident to those skilled in the art, spider gear 450 reverses load direction of rotation of the crankshaft of wedge hinge assembly 350 with respect to load direction of rotation of wedge hinge assembly 320, and vice versa. Thus, as shown in FIG. 8, an enlarged front view of spider gear assembly 450, and FIG. 9, a cutaway front view thereof, input crankshaft 325 of wedge hinge assembly 320 is fixedly and axially attached to left vertical beveled gear 470a. Output crankshaft 355 of wedge hinge assembly 350 passes through the central portion of right vertical beveled gear 470b and is fixedly attached to cylindrical and vertical shaft 475 of spider gear assembly 450. Accordingly, as is well known in the art, the cooperation between pair of horizontal beveled gears 465a and b, and corresponding pair of vertical beveled gears 470a and b, follows the direction of rotation of plates 360 and 365 of wedge hinge assembly 350 to be opposite to the direction of rotation of plates 330 and 335 of wedge hinge assembly 320. Thus, if wedge hinge assembly 320 is rotating counterclockwise, then wedge hinge assembly 350 will be rotating clockwise, and, of course, vice versa. In accordance with the present invention, any number of pairs of wedge hinge assemblies may be cascaded to accomplish the purposes herein described.

Figure 7:
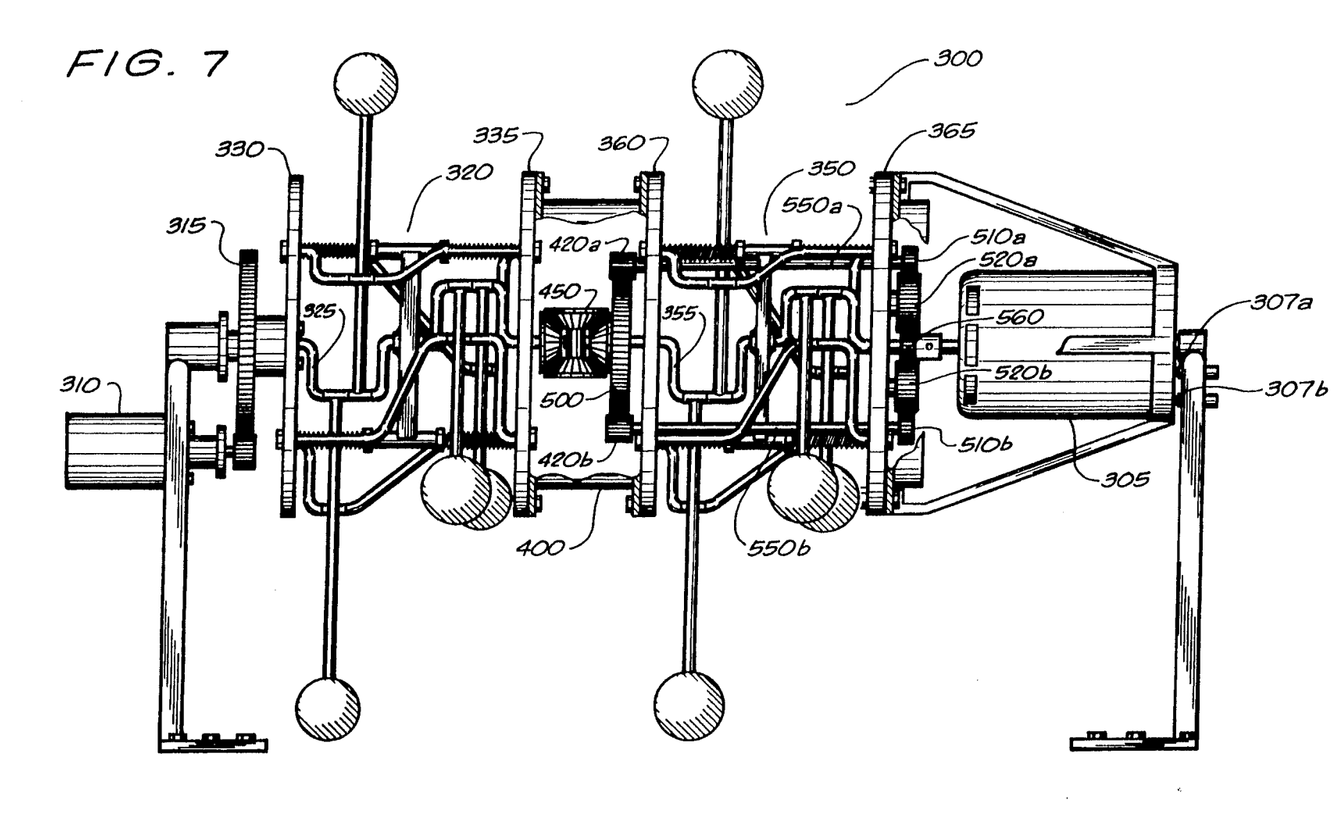
FIG. 7 is a front view of a cascaded structure comprised of two wedge hinge transmission apparatuses embodying the present invention.

Referring now to FIG. 7, the energy transmitted by spur load gear 500 is transmitted to input spur gears 420a and b, and then transmitted to output shafts 550a and b into output spur gears 510a and b. Output spur gears 510a and b, in turn, cause the rotation of reverse idler gears 520a and b, thereby powering generator gear shaft assembly 560, which idles on crankshaft 355 of second wedge hinge assembly 350. This causes reversing between the stator of generator 305 and its armature, resulting in multiplication of the RPM within the generator's housing.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

I claim:

1. A transmission apparatus comprising:
   a first substantially circular plate;
   a second substantially circular plate parallel to and spaced apart from said first plate, and fixedly attached thereto;
   a crankshaft disposed transversely of said first and second plates and passing axially therethrough, and supported by a crossbrace member disposed transversely thereof, and fixedly attached at each end to a support brace member disposed parallel of said longitudinal axis of said crankshaft and fixedly attached to said first and second plates;
   said crankshaft comprising a first crank portion and a second crank portion interconnected by a contiguous central boss portion, with said second crank portion disposed oppositely of said first crank portion, with respect to said longitudinal axis of said crankshaft;
   each said crankshaft first and second crank portion comprising, successively, an edge boss member, a first transversal member, a crank member, and a second transversal member;
   a plurality of wedge hinge assemblies with each said wedge hinge assembly comprising an arm having a weight at its remote end, and adapted to be pivotally attached with said crankshaft at the other end, and further adapted to be pivotally attached to a wedge hinge between said ends thereof, for rotating said crankshaft in response to functionally related rotation of said first and second plates; and
   said crank member of each said first and second crank portion of said crankshaft adapted to pivotally receive two said remote ends of said arm of each two of said wedge hinge assemblies, and receiving two said remote ends of said arms of said each of two said wedge hinge assemblies.

2. The apparatus described in claim 1 wherein each said wedge hinge comprises, successively, a first boss member, a third transversal member, a wedge crank member, a fourth transversal member, and a second boss member, to form a wedge crank portion adapted to cooperate with a corresponding said first or second crank portion of said crankshaft.

3. A transmission apparatus comprising:
   a first substantially circular plate;
   a second substantially circular plate parallel to and spaced apart from said first plate, and fixedly attached thereto;
   a crankshaft disposed transversely of said first and second plates and passing axially therethrough, and being supported by a crossbrace member disposed transversely thereof, and fixedly attached at each end to a support brace member disposed parallel of the longitudinal axis of said crankshaft and fixedly attached to said first and second plates;
   said crankshaft comprising a first crank portion and a second crank portion interconnected by a contiguous central boss portion, with said second crank portion disposed oppositely of said first crank portion, with respect to said longitudinal axis of said crankshaft;
   each said crankshaft first and second crank portion comprising, successively, an edge boss member, a first transversal member, a crank member, and a second transversal member;
   four wedge hinge assemblies with each said wedge hinge assembly comprising an arm having a weight at its remote end, and adapted to be pivotally attached with said crankshaft at the other end, and further adapted to be pivotally attached to a wedge hinge between said ends thereof, for rotating said crankshaft in response to functionally related rotation of said first and second plates;

each of said wedge hinges comprising, successively, a first boss member, a third transversal member, a wedge crank member, a fourth transversal member, and a second boss member, to form a wedge crank portion adapted to cooperate with a corresponding said first or second crank portion of said crankshaft; and said crank member of each said first and second crank portion of said crankshaft adapted to pivotally receive two said remote ends of said arm of each two of said wedge hinge assemblies.

* * * * *